(12) United States Patent
Kawaguchi et al.

(10) Patent No.: US 10,562,470 B2
(45) Date of Patent: Feb. 18, 2020

(54) WIRE HARNESS HAVING MOVABLE AND FIXING SUPPORTS FOR PATH CONTROL

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventors: Tomoya Kawaguchi, Yokkaichi (JP); Masaharu Suetani, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/307,044

(22) PCT Filed: Jun. 1, 2017

(86) PCT No.: PCT/JP2017/020376
§ 371 (c)(1),
(2) Date: Dec. 4, 2018

(87) PCT Pub. No.: WO2017/213008
PCT Pub. Date: Dec. 14, 2017

(65) Prior Publication Data
US 2019/0217792 A1 Jul. 18, 2019

(30) Foreign Application Priority Data

Jun. 9, 2016 (JP) .................................. 2016-115186

(51) Int. Cl.
*B60R 16/02* (2006.01)
*H01B 7/00* (2006.01)
*H02G 3/04* (2006.01)
*H02G 3/32* (2006.01)

(52) U.S. Cl.
CPC .......... *B60R 16/0215* (2013.01); *B60R 16/02* (2013.01); *H01B 7/00* (2013.01);
(Continued)

(58) Field of Classification Search
None
See application file for complete search history.

(56) References Cited

U.S. PATENT DOCUMENTS 9,776,581 B2 * 10/2017 Oga ................... B60R 16/0215
9,873,391 B2 * 1/2018 Suguro ............... B60R 16/0215
(Continued)

FOREIGN PATENT DOCUMENTS

| JP | 2011-028892 A | 2/2011 |
|----|---------------|--------|
| JP | 2011-155763 A | 8/2011 |
| JP | 2012-197034 A | 10/2012 |

OTHER PUBLICATIONS

Jul. 4, 2017 International Search Report issued in International Patent Application No. PCT/JP2017/020376.

*Primary Examiner* — Timothy J Thompson
*Assistant Examiner* — Muhammed Azam
(74) *Attorney, Agent, or Firm* — Oliff PLC

(57) ABSTRACT

A wire harness that includes an electric line; a corrugated tube that includes annular ridges and annular valleys alternately formed along an extension direction, and that covers the electric line; a path control that is arranged in at least one section that extends in the extension direction of the electric line so as to be parallel to the corrugated tube, and that is shaped so as to conform to a path along which the electric line is arranged in the section and to control the path in the
(Continued)

section; and a support that includes a first support that supports the path control and a second support that is fitted into the annular valleys of the corrugated tube so as to support the corrugated tube, the support being configured to connect the path control to the corrugated tube.

6 Claims, 4 Drawing Sheets

(52) U.S. Cl.
CPC .......... *H01B 7/0045* (2013.01); *H02G 3/0468* (2013.01); *H02G 3/32* (2013.01)

(56) References Cited

U.S. PATENT DOCUMENTS

| 9,947,439 | B2* | 4/2018 | Inao | B60R 16/0215 |
| 10,077,013 | B2* | 9/2018 | Sugino | B60R 16/0215 |
| 10,277,017 | B2* | 4/2019 | Yoshida | B60R 16/0215 |
| 2014/0311796 | A1* | 10/2014 | Gannon | H01B 7/2825 174/72 A |
| 2015/0136482 | A1* | 5/2015 | Adachi | B60R 16/0215 174/72 A |
| 2015/0136483 | A1* | 5/2015 | Inao | H01B 7/2825 174/72 A |
| 2016/0031393 | A1* | 2/2016 | Oga | B60R 16/0215 174/72 A |
| 2016/0144807 | A1* | 5/2016 | Inao | B60R 16/0215 174/72 A |
| 2016/0164269 | A1* | 6/2016 | Inao | B60R 16/0207 174/68.3 |
| 2017/0001580 | A1* | 1/2017 | Hagi | B60R 16/0215 |
| 2018/0118293 | A1* | 5/2018 | Kato | B60R 16/02 |
| 2018/0159309 | A1* | 6/2018 | Yanazawa | H02G 15/043 |

* cited by examiner

12# WIRE HARNESS HAVING MOVABLE AND FIXING SUPPORTS FOR PATH CONTROL

This application is the U.S. National Phase of PCT/JP2017/020376 filed Jun. 1, 2017, which claims priority from JP 2016-115186 filed Jun. 9, 2016, the entire disclosure of which is incorporated herein by reference.

BACKGROUND

The present disclosure relates to a technique for controlling the path of an electric line in a vehicle or the like.

JP 2011-155763A discloses a technique for controlling the path of an electric line by binding a bone member, which is shaped to conform to the path along which the electric line is arranged, to a corrugated tube that surrounds the electric line.

In addition thereto; as a path control member, a tubular member may be used that includes a straight tube portion and a bellows portion alternately formed in the extension direction, and surrounds the electric line.

SUMMARY

However, according to the technique disclosed in JP 2011-155763A, the corrugated tube-equipped electric line and the bone member are connected by sandwiching them between a pair of holding portions serving as a binding member from both sides, and then fastening the pair of holding portions with bolts. Accordingly, the operation of connecting the electric line and the bone member is complex.

An exemplary aspect of the disclosure provides a technique for controlling the path of an electric line using a path control member, with which it is possible to easily connect a corrugated tube-equipped electric line and a path control member.

In order to solve the problem described above, a wire harness according to a first aspect is a wire harness including: an electric line; a corrugated tube that includes annular ridges and annular valleys alternately formed along an extension direction, and that covers the electric line; a path control that is arranged in at least one section that extends in the extension direction of the electric line so as to be parallel to the corrugated tube, and that is shaped so as to conform to a path along which the electric line is arranged in the section and to control the path in the section; and a support that includes a first support that supports the path control and a second support that is fitted into the annular valleys of the corrugated tube so as to support the corrugated tube, the support being configured to connect the path control to the corrugated tube, wherein the support includes a movable support that is movable relative to the path control in the extension direction of the path control, with the first support supporting the path control.

A wire harness according to a second aspect is the wire harness according to the first aspect, wherein the support further includes a fixing support whose first support is formed fixable to the path control while restricting movement of the path control in the extension direction, and that fixes the path control to the corrugated tube while restricting the movement of the path control in the extension direction.

A wire harness according to a third aspect is the wire harness according to the second aspect, wherein the first support of the fixing support is formed so as to be capable of fixing respective ends of a plurality of the path controls.

A wire harness according to a fourth aspect is the wire harness according to the second or third aspect, wherein the fixing support further includes a vehicle body fixing for attaching the electric line to a vehicle body.

A wire harness according to a fifth aspect is the wire harness according to any one of the first to fourth aspects, wherein the path control is formed using a flexurally deformable that can undergo plastic deformation.

A wire harness according to a sixth aspect is the wire harness according to any one of the first to fifth aspects, wherein a plurality of sections in the extension direction of the electric line are path-controlled by separate path controls.

According to the first to sixth aspects, the movable support is movable relative to the path control in the extension direction, and thus the path control can be easily connected to the corrugated tube at a desired position. For example, when attaching the path control to the movable support that has already been attached to the corrugated tube, the path control can be moved to a desired position relative to the movable support while being supported by the movable support. Accordingly, the corrugated tube-equipped electric line and the path control can be easily connected using the movable support.

In particular, according to the second aspect, the path control can be fixed to a desired position on the corrugated tube using the fixing support.

In particular, according to the third aspect, the number of fixing supports can be reduced when there are a plurality of path controls.

In particular, according to the fourth aspect, the fixing support also functions as a vehicle body fixing, and it is therefore unnecessary to separately provide a vehicle body fixing.

In particular, according to the fifth aspect, the path control can be formed through flexural deformation.

In particular, according to the sixth aspect, the paths of a plurality of sections extending in the extension direction of the electric line are controlled by separate path controls. Accordingly, each path control can be made relatively short, and thus each path control can be easily connected to the corrugated tube-equipped electric line. Furthermore, in the case where it is necessary to perform a design change only on one of the sections of the electric line, by simply performing a design change on the path control of that section, it is possible to cope with the design change of the path of the electric line. Also, even in different types of vehicles, if there are sections that have a similar path, common path controls can be used in the sections. Also, the path controls are sized so as to conform to the size of each section, and thus the size of the path controls can be reduced. Accordingly, the path controls are less bulky during transportation. It is thereby possible to reduce the cost for path control of the electric line using the path controls.

BRIEF, DESCRIPTION OF THE DRAWINGS

DETAILED DESCRIPTION OF EMBODIMENTS

Embodiment

Figure 1:
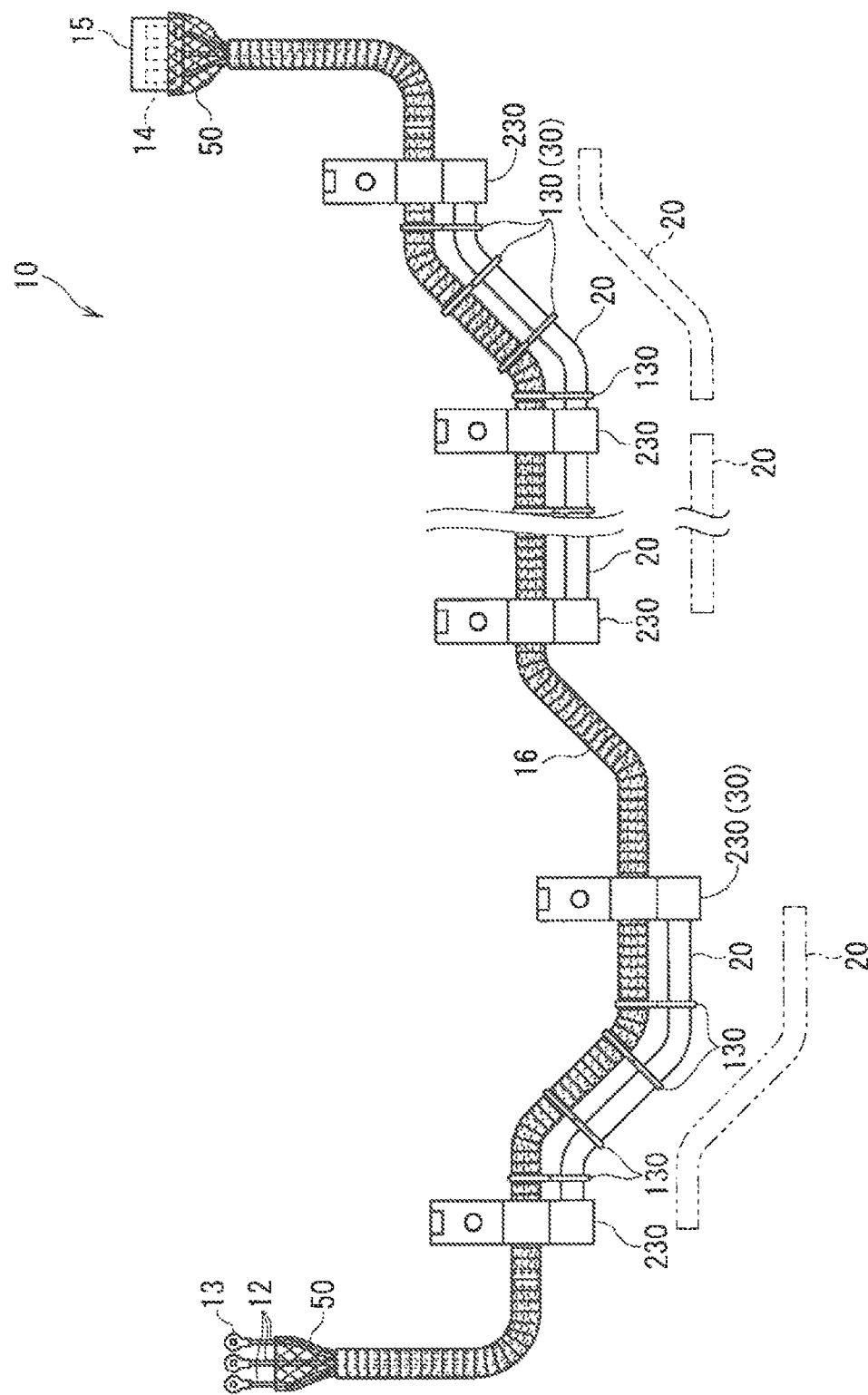
FIG. 1 is a schematic plan view of a wire harness according to one embodiment.
Figure 2:
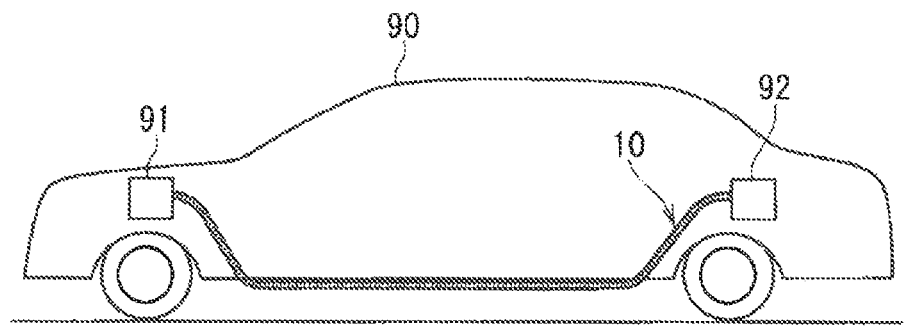
FIG. 2 is a diagram showing an example of installation of the wire harness in a vehicle.
Figure 3:
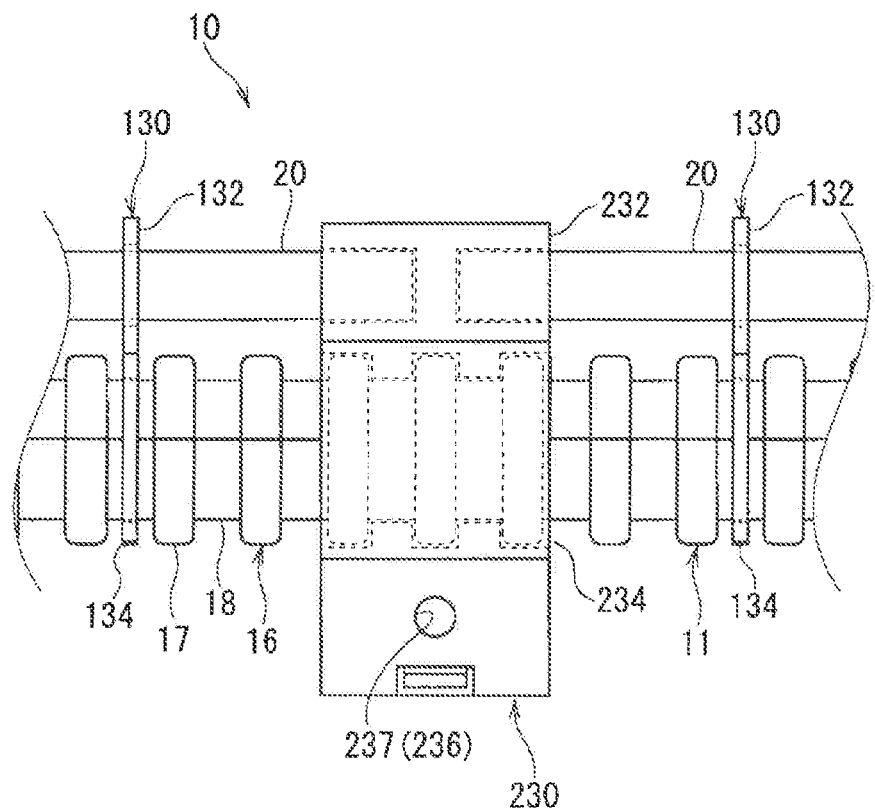
FIG. 3 is a partially enlarged schematic view of FIG. 1.
Figure 4:
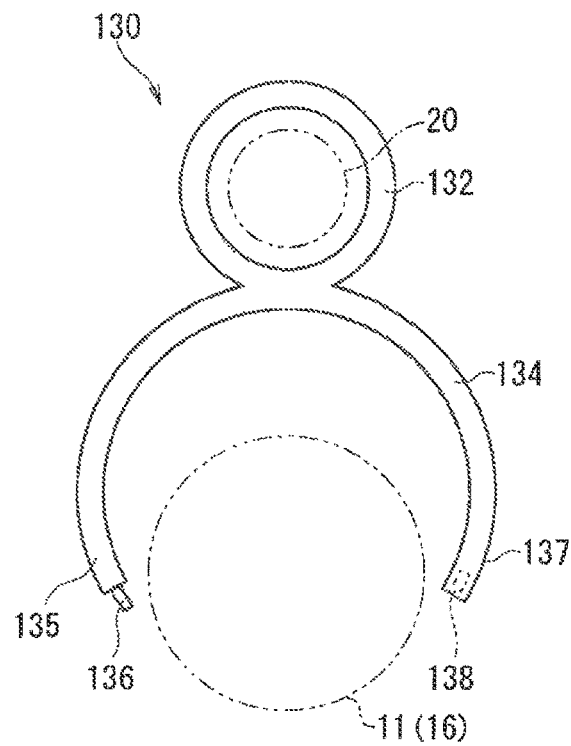
FIG. 4 is a schematic front view of a movable support member in an open state.
Figure 5:
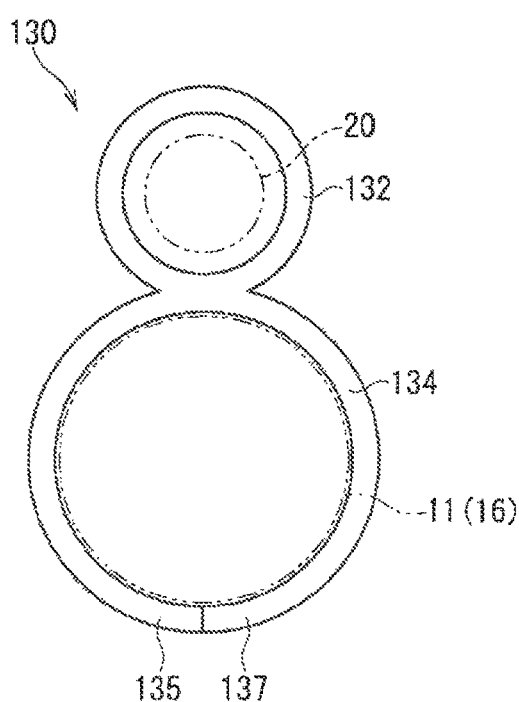
FIG. 5 is a schematic front view of the movable support member in a closed state.
Figure 6:
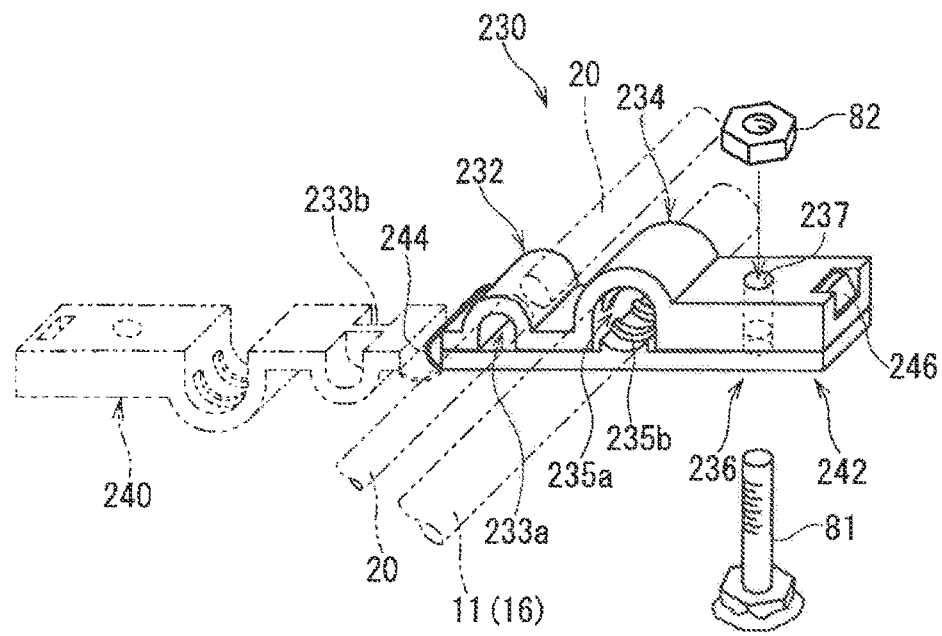
FIG. 6 is a perspective view of a fixing support member.

Hereinafter, a wire harness according to one embodiment will be described. FIG. 1 is a schematic plan view of a wire harness 10 according to one embodiment. FIG. 2 is a diagram showing an example of installation of the wire harness 10 in a vehicle 90. FIG. 3 is a partially enlarged schematic view of FIG. 1. FIG. 4 is a schematic front view of a movable support member 130 in an open state. FIG. 5 is a schematic front view of the movable support member 130 in a closed state. FIG. 6 is a perspective view of a fixing support member 230.

The wire harness 10 includes an electric line 12, a corrugated tube 16, a path control member 20 (path control), and a support member 30 (support).

As shown in FIG. 2, the wire harness 10 is installed so as to extend, via the vehicle floor, between a first device 91 and a second device 92 that are installed in the vehicle 90, which may be, for example, an automobile. In the example shown in FIG. 2, the first device 91 is disposed on the front side of a cabin of the vehicle 90, and the second device 92 is disposed on the rear side of the cabin of the vehicle 90, For example, one of the first device 91 and the second device 92 may be a battery, and the other device may be an inverter device.

The wire harness 10 may include at least one electric line 12. In the example shown in FIG. 1, the wire harness 10 includes three electric lines 12. Each electric line 12 includes, for example, a core wire made of a conductive material, and an insulating coating that is made of an insulating material and covers the core wire. The core wire is, for example, a metal wire composed mainly of copper, aluminum or the like. The core wire may be composed of one strand, or may be composed of a plurality of strands. In the case where the core wire is composed of a plurality of strands, the plurality of strands may or may not be twisted together. In each of the plurality of electric lines 12, a first terminal fitting 13 is connected to one end portion, and a second terminal fitting 14 is connected to the other end portion. In a state in which the wire harness 10 is installed in the vehicle 90, the first terminal fittings 13 are electrically connected to one of the first device 91 and the second device 92, and the second terminal fittings 14 are electrically connected to the other device.

In the example shown in FIG. 1, the first terminal fittings 13 are terminal fittings that are fixed to a mating member with a screw. On the other hand, the second terminal fittings 14 are terminal fittings that are housed in a cavity of a connector 15. However, in the plurality of electric lines 12, the shape of the first terminal fittings 13 and the shape of the second terminal fittings 14 are not limited to those described above.

It is preferable that an intermediate portion of the electric lines 12 extending in the extension direction is maintained in a specified shape in order to inhibit interference with a surrounding member, or the like. Also, a portion extending from the terminal end portions of the electric line 12 that are connected to the first device 91 or the second device 92 is preferably deformable in order for the terminal end portion to be easily connected to a mating member. Accordingly the intermediate portion of the electric line 12 extending in the extension direction is path-controlled.

Here, the intermediate portion of the electric line 12 extending in the extension direction may include an area where path control is not so necessary. In this case, as shown in FIG. 1, in the intermediate portion of the electric line 12 extending in the extension direction, there is an area where path control is not performed. In particular, in this example, a section where path control is not performed is provided between sections where path control is performed. However, the intermediate portion of the electric line 12 extending in the extension direction may be continuously path-controlled.

The corrugated tube 16 has a bellows structure in which an annular ridge portion 17 (annular ridge) and an annular valley portion 18 (annular valley) are alternately formed in the extension direction. The corrugated tube 16 is a molded member made of a synthetic resin such as, for example, polyethylene (PE), polypropylene (PP), polyamide (PA), polybutylene terephthalate (PBT), or ABS resin. The corrugated tube 16 is made of, for example, a material that is harder than the insulating coating of the electric lines 12, but is flexurally deformable because of having the bellows structure.

In the wire harness 10, the corrugated tube 16 covers the electric lines 12. For example, the corrugated tube 16 covers an intermediate region of a bundle of the electric lines 12 excluding a portion extending from each end of the bundle of the electric lines 12.

For example, in the corrugated tube 16, a slit (not shown) extending over the entire length is formed. In this case, the intermediate region of the electric lines 12 is inserted into a hollow portion of the corrugated tube 16 via the slit.

Also, in the present embodiment, support members 30 are provided to the corrugated tube 16 at a plurality of locations so as to surround and support the corrugated tube 16, thereby preventing the electric lines 12 from slipping out of the slit formed in the corrugated tube 16. Alternatively, a binding member (not shown) such as adhesive tape or a cable tie may be wound around the corrugated tube 16. In this case, the binding member prevents the electric lines 12 from slipping out of the slit formed in the corrugated tube 16.

Also, the corrugated tube 16 may have a fitting structure for connecting opposing edge portions of the slit. For example, the fitting structure may include a first projecting portion that projects outward from one of the edge portions of the slit and a second projecting portion that projects outward from the other edge portion of the slit. In this case, as a result of the first projecting portion being fitted into a recess formed in the second projecting portion, the opposing edge portions of the slit formed in the corrugated tube 16 are connected.

Hereinafter, an electric line(s) 12 to which a corrugated tube 16 has been attached may be referred to as a "wire harness main body 11".

The path control member 20 is provided in at least one section (hereinafter referred to as "path-controlled section") extending in the extension direction of the electric line 12 in parallel to the corrugated tube 16. In this example, a plurality of path control members 20 are provided in a plurality of sections. Each of the plurality of path control members 20 is shaped so as to conform to the shape of the path along which the electric lines 12 are arranged in the path-controlled section. The plurality of path control members 20 respectively control the paths in the plurality of path-controlled sections along which the electric lines 12 are arranged. In the example shown in FIG. 1, three path control members 20 respectively path-control three path-controlled sections. Two out of the three path control members 20 path-control adjacent path-controlled sections. The remaining path control member 20 path-controls a path-controlled section that is spaced apart from the two path control members 90.

Each path control member 20 is formed using a pipe-like or rod-like member. Each path control member 20 can be made of aluminum, iron, copper, an alloy thereof, or resin. In the example shown in FIG. 4, the path control member 20 is formed so as to have a circular cross section, but may also be formed so as to have a cross-sectional shape other than the circular cross-sectional shape, such as, for example, a rectangular cross-sectional shape.

The path control member 20 is formed using a flexurally deformable member that can undergo plastic deformation. Accordingly, the path control member 20 can be easily produced by cutting an elongated member to a desired length and flexurally deforming the member having the desired length using a bending machine (also called a "hand bender"), However, the path control member 20 may also be produced by a method other than this method, and may be, for example, a molded article produced using a die.

The path control member 20 is formed so as to be capable of maintaining a path-controlled section of a wire harness main body 11 in a shape that conforms to the specified path while being supported on the corrugated tube 16 by the support member 30. In order for the path control member 20 to maintain the path-controlled section of the wire harness main body 11 in a shape that conforms to the specified path, the control member 20 needs to have a certain degree of rigidity. Normally, in order to control a path-controlled section of the wire harness main body 11 to a bent path, the path control member 20 may be configured so as to have a rigidity that is greater than the restoring force of the bent wire harness main body 11 in the path-controlled section that attempts to return to its original shape and also has such a rigidity that the bent wire harness main body 11 in the path-controlled section does not deform due to human power or by vibrations that occur while the vehicle is moving. Also, normally, in order to control a path-controlled section to a linear path, the path control member 20 provided in the path-controlled section may be configured so as to have such a rigidity that the wire harness main body 11 in the path-controlled section does not deform due to human power or vibrations that occur while the vehicle is moving.

As described above, the rigidity of individual path control members 20 is set according to the thickness of the member in the path-controlled section to be controlled, the number of electric lines 12, the material, and the shape to which it is controlled (the amount of flexural deformation), and the like. At this time, the rigidity of the path control member 20 is determined by the material of the path control member 20, the shape of the path control member 20, whether the path control member 20 has a hollow structure or a solid structure, the thickness of the path control member 20, or the like. For example, in the case where the path-controlled section to be controlled is a trunk line portion, or the amount of flexural deformation in the path controlled section is large, the restoring force of the wire harness main body 11 in the path-controlled section that has been flexurally deformed is large. In this case, a member made of a material that has a relatively large rigidity, a member having a large thickness, or the like may be used as the path control member 20. On the other hand, in the case where the path-controlled section to be controlled is a branch line portion branched from the trunk line portion, or the amount of flexural deformation in the path-controlled section is small, the restoring force of the wire harness main body 11 in the path-controlled section that has been flexurally deformed is not so large. In this case, as the path control member 20, a member made of a material that has a relatively small rigidity, a member having a small diameter, or the like may be used. Accordingly, the plurality of path control members 20 provided to one wire harness 10 may be made of different materials, or may have different diameters or the like. Of course, the plurality of path control members 20 provided to one wire harness 10 may be made of the same material, or may have the same diameter or the like.

The end portions of each path control member 20 are preferably formed in a linear shape. In other words, it is preferable that adjacent path-controlled sections are partitioned at the linear portions. With this configuration, the support member 30 can easily support the end portions as compared with the configuration in which the end portions of the path control member 20 are formed in a curved shape.

The support member 30 is a member that connects the path control member 20 to the corrugated tube 16, The support member 30 includes a first supporting portion (first support) that supports the path control member 20, and a second supporting portion (second support) that supports the corrugated tube 16 while fitting into the annular valley portion 18 of the corrugated tube 16. The shape of the first supporting portion and the second supporting portion will be described in detail later. Also, in this example, the support member 30 includes two different types of support members 30: a movable support member 130; and a fixing support member 230 (fixing support).

The movable support member 130 is movable relative to the path control member 20 in the extension direction of the path control member 20 while supporting the path control member 20.

The first supporting portion 132 of the movable support member 130 is movable relative to the path control member 20 in the extension direction of the path control member 20 while supporting the path control member 20. In this example, the first supporting portion 132 is formed in a continuous annular shape that is hollow inside. The first supporting portion 132 is configured to have an inner diameter larger (slightly larger in this example) than the outer diameter of the path control member 20. Accordingly, the path control member 20 can be inserted through the hollow portion of the first supporting portion 132.

The second supporting portion 134 of the movable support member 130 includes a portion that is formed in an annular shape having an inner diameter smaller than the outer diameter of the annular ridge portion 17 and so as to be capable of fitting over the annular valley portion 18 of the corrugated tube 16.

More specifically, as shown in FIG. 4, the second supporting portion 134 is formed in an arc shape that is open on its distal end side. The first supporting portion 132 and the second supporting portion 134 are formed as a unitary body such that the center portion of the arc of the second supporting portion 134 is continuous with the first supporting portion 132. As described above, the second supporting portion 134 is a portion that supports the corrugated tube 16. The second supporting portion 134 is configured so as to be, for example, elastically deformable. The second supporting portion 134 is formed so as to be capable of changing between an open state and a closed state. As shown in FIG. 4, the open state is a state in which a distal end portion 135 and a distal end portion 137 are spaced apart from each other. As shown in FIG. 5, the closed state is a state in which the distal end portion 135 and the distal end portion 137 are connected to each other. In the closed state, a hollow portion for supporting the corrugated tube 16 is formed on the inner circumferential side of the second supporting portion 134.

The movable support member 130 is formed such that the center line of the hollow portion of the second supporting portion 134 is parallel to the center line of the hollow portion of the first supporting portion 132. Accordingly with the movable support member 130, the corrugated tube 16 can be attached in parallel to the path control member 20.

The distal end portion 135, which is one of the distal end portions of the second supporting portion 134, includes a protruding portion 136 that protrudes outward, and the distal end portion 137, which is the other distal end of the second supporting portion 134, includes an attachment hole 138 into which the protruding portion 136 is fitted. The second supporting portion 134 bends as a whole by moving the distal end portions 135 and 137 of the second supporting portion 134 in the open state. In this state, by fitting the protruding portion 136 into the attachment hole 138, the protruding portion 136 and the attachment hole 138 can be connected. In a state in which the protruding portion 136 and the attachment hole 138 are connected to each other, due to the action of frictional force on the contact surface between the protruding portion 136 and the attachment hole 138, the connection between the distal end portion 135 and the distal end portion 137 can be maintained. Here, the second supporting portion 134 has a rigidity that is sufficient to be capable of maintaining the state in which the second supporting portion 134 is deformed in the closed state and supporting the corrugated tube 16 that has been attached.

By releasing the fitting between the attachment hole 138 and the protruding portion 136, the distal end portions of the second supporting portion 134 elastically restore such that the distal end portion 135 and the distal end portion 137 are spaced apart from each other, as a result of which the second supporting portion 134 is brought into the open state.

As shown in FIG. 4, the distance between the distal end portion 135 and the distal end portion 137 in the open state is set to a dimension larger (slightly larger) than the diameter of the annular valley portion 18 of the corrugated tube 16 so that the annular valley portion 18 of the corrugated tube 16 can pass through between the distal end portion 135 and the distal end portion 137 of the second supporting portion 134 in a state in which the second supporting portion 134 is in the open state. Accordingly; when the second supporting portion 134 is in the open state, the annular valley portion 18 of the corrugated tube 16 can be fitted into the internal space of the second supporting portion 134 from the side on which the distal end portion 135 and the distal end portion 137 are located. The distance between the distal end portion 135 and the distal end portion 137 in the open state may also be set to a dimension smaller than the diameter of the annular valley portion 18 of the corrugated tube 16. In this case, the distance between the distal end portion 135 and the distal end portion 137 of the second supporting portion 134 is widened, and then, the annular valley portion 18 of the corrugated tube 16 is fitted into the second supporting portion 134.

As shown in FIG. 5, in a state in which the second supporting portion 134 is in the closed state, the length of the inner circumferential portion of the second supporting portion 134 is set to a dimension that is the same as or slightly larger than the outer circumferential length of the annular valley portion 18 of the corrugated tube 16. Accordingly, when the second supporting portion 134 is in the closed state, the annular valley portion 18 of the corrugated tube 16 can be supported by the hollow portion of the second supporting portion 134. At this time, the distal end portion 135 and the distal end portion 137 are connected as a result of the protruding portion 136 being fitted into the attachment hole 138, and thus the corrugated tube 16 does not come off from the second supporting portion 134. Also, at this time, the length of the inner circumferential portion of the second supporting portion 134 is set to a dimension smaller than the outer circumferential length of the annular ridge portion 17 of the corrugated tube 16. This configuration prevents the corrugated tube 16 from moving in the extension direction of the corrugated tube 16 relative to the second supporting portion 134.

In this example, the movable support member 130 is a molded member made of a synthetic resin such as, for example, polyethylene (PE), polypropylene (PP), polyimide (PA), polybutylene terephthalate (PBT), or ABS resin. The first supporting portion 132 and the second supporting portion 134 are formed as a unitary body through molding using a die. However, the first supporting portion 132 and the second supporting portion 134 may also be formed as separate portions. An example in which the first supporting portion 132 and the second supporting portion 134 are formed as separate portions will be described in detail later.

The movable support member 130 is provided in accordance with the length of the path control member 20 and the shape of the path-controlled section, That is, the number of movable support members 130 provided in one path-controlled section and the interval of the movable support members 130 may be set as appropriate. If a path-controlled section has a bent portion, the movable support members 130 should be provided near both ends of the bent portion. That is, the movable support member 130 may be provided near the boundary between the bent portion and the linearly extending portions. With this configuration, in the bent portion, the wire harness main body 11 can be path-controlled to a shape much closer to the shape of the path control member 20.

The second supporting portion 134 may also be a wire. In this case, the movable support member 130 is formed by insert molding a wire that will serve as the second supporting portion 134 when the first supporting portion 132 is formed through molding using a die. By using a wire as the second supporting portion 134, the second supporting portion 134 can have such a rigidity that it is possible to maintain the state in which the second supporting portion 134 is deformed in the closed state and support the corrugated tube 16. Accordingly, in a state in which the second supporting portion 134 is in the closed state, it is not necessary to connect the distal end portions 135 and 137 to each other. Alternatively, the second supporting portion 134 may also be a cable tie. In this case, a resin cable tie and the first supporting portion 132 are formed as a unitary body through molding using a die.

The fixing support member 230 fixes the path control member 20 to the corrugated tube 16 while restricting (controlling) the movement of the path control member 20 in the extension direction. The fixing support member 230 is a member that fixes the path control member 20 to the corrugated tube 16 so as to prevent the positional offset between the path control member 20 and the corrugated tube 16 in the extension direction while supporting the corrugated tube 16 and path control member 20. Also, in this example, the fixing support member 230 is also a member that is fixed to a vehicle body such as the floor board of the vehicle 90. Accordingly, the corrugated tube 16 is fixed to the vehicle body via the fixing support member 230, as a result, of which the wire harness 10 is fixed to the vehicle body.

The fixing support member 230 includes a first supporting portion 232 that is formed fixable to the path control member 20 while restricting the movement of the path control member 20 in the extension direction. In this example, the first supporting portion 232 of the fixing support member 230 is formed so as to be capable of fixing the end portions of two path control members 20 that path control adjacent sections.

As shown in FIG. 6, the fixing support member 230 includes, in addition to the first supporting portion 232 that is capable of supporting the path control member 20 and a second supporting portion 234 that is capable of supporting the corrugated tube 16, a vehicle body fixing portion 236 that can be fixed to a vehicle body. In FIG. 6, a stud bolt 81 and a nut 82 for fixing the vehicle body fixing portion 236 of the fixing support member 230 to a vehicle body are also shown.

The fixing support member 230 is a molded member made of a synthetic resin such as, for example, polyamide (PA), polypropylene (PP), polybutylene terephthalate (PBT), or ABS resin. Alternatively, the fixing support member 230 may be a metal member.

In the example shown in FIG. 6, the fixing support member 230 includes a first half 240 and a second half 242 that sandwich a portion of the corrugated tube 16 and a portion of the path control member 20, and a hinge portion 244 that connects the first half 240 and the second half 242 so that they are capable of pivoting relative to each other. Also, a portion of the first half 240 and a portion of the second half 242 constitute a lock portion 246 that maintains a state in which the first half 240 and the second half 242 are combined as a result of the first half 240 and the second half 242 being engaged with each other.

The first half 240 and the second half 242 constitute the first supporting portion 232 and the second supporting portion 234 in a state in which the first half 240 and the second half 242 are combined.

In the example shown in FIG. 6, the first supporting portion 232 supports the path control member 20 by sandwiching a portion of the path control member 20. Accordingly, a control member insertion hole 233a through which the path control member 20 passes is formed in the first supporting portion 232. The inner diameter of the control member insertion hole 233a is set to be smaller (slightly smaller in this example) than the outer diameter of the path control member 20.

The first half 240 and the second half 242 may be combined while sandwiching a portion of the path control member 20, Alternatively the path control member 20 may be press-fitted into the first half 240 and the second half 242 that have been combined.

The first half 240 and the second half 242 are combined while sandwiching a portion of the corrugated tube 16.

In the example shown in FIG. 6, the second supporting portion 234 supports the corrugated tube 16 by sandwiching a portion of the corrugated tube 16. Accordingly, a tube insertion hole 235a through which the corrugated tube 16 passes is formed in the second supporting portion 234. The inner diameter of the tube insertion hole 235a is set to be larger (slightly larger in this example) than the outer diameter of the annular ridge portion 17. Furthermore, a ridge portion 235b that fits into the annular valley portions 18 on the outer circumferential surface of the corrugated tube 16 is formed on the inner surface of the tube insertion hole 235a of the second supporting portion 234. In the portion where the ridge portion 235b is formed, the inner diameter of the tube insertion hole 235a is set to be smaller than the outer diameter of the annular ridge portions 17 and larger than the outer diameter of the annular valley portions 18. Accordingly, when the fixing support member 230 attempts to move relative to the corrugated tube 16 in the extension direction, an annular ridge portion 17 abuts against the ridge portion 235b, and thus the positional offset between the annular ridge portion 17 and the ridge portion 235b is inhibited.

The vehicle body fixing portion 236 is a portion in which a fixing hole 237 through which a stud bolt 81 is inserted is formed. In this example, a portion of the fixing hole 237 is formed in each of the first half 240 and the second half 242. That is, in a state in which the first half 240 and the second half 242 are combined, the holes formed respectively in the first half 240 and the second half 242 constitute the fixing hole 237, which communicates between the first half 240 and the second half 242. Accordingly, the vehicle body fixing portion 236 is formed in a state in which the first half 240 and the second half 242 are combined. Also, as a result of the vehicle body fixing portion 236 being fixed to the vehicle body with the stud bolt 81, the first half 240 and the second half 242 are prevented from being opened. The fixing hole 237 may be a hole formed in either one of the first half 240 and the second half 242.

In the example shown in FIG. 1, the wire harness 10 includes a plurality of fixing support members 230 that are attached to the corrugated tube 16 at a plurality of locations. The fixing support members 230 are provided so as to fix the end portions of the path control members 20. Each fixing support member 230 is configured such that the fixing support member 230 fixes mutually abutting one ends of two path control members 20 provided in adjacent path-controlled sections. In this case, as shown in FIG. 6, a partition wall 233b may be formed in the control member insertion hole 233a of the fixing support member 230. The partition wall 233b is formed so as to, for example, protrude inward from the inner surface of the intermediate portion of the control member insertion hole 233a in the extension direction and close the center portion of the control member insertion hole 233a. As a result of the partition wall 233b being formed, the amount of insertion of two path control members 20 into the control member insertion hole 233a is restricted.

In this example, the wire harness 10 includes a shield member 50. However, the shield member 50 may also be omitted. In this example, a plurality of electric lines 12 are covered with one shield member 50, and the shield member 50 is covered with the corrugated tube 16. However, each electric line 12 may also be covered with a separate shield member. As the shield member, it is possible to use a braided wire obtained by braiding metal wires, or a metal foil. Alternatively, a metal fabric woven of metal wires may be used.

Production Method

A method for producing a wire harness 10 will be described next.

First, a wire harness main body 11 and a path control member 20 are prepared. Here, a description will be given assuming that a wire harness main body 11 to which support members 30 have already been attached is prepared.

For preparation of a wire harness main body 11 to which support members 30 have already been attached, first, electric lines 12 are arranged and bundled on an assembly board. Next, a corrugated tube 16 is slit open, and the electric lines 12 are placed within the corrugated tube 16 so as to form a wire harness main body 11. Then, movable support members 130 and fixing support members 230 are fixed to the corrugated tube 16. In order to fix each movable support member 130 to the corrugated tube 16, first, the second supporting portion 134 is brought into the open state, and the annular valley portion 18 of the corrugated tube 16 is set in the hollow portion of the second supporting portion 134. Then, the second supporting portion 134 is elastically deformed into the closed state, and the protruding portion 136 is fitted into the attachment hole 138. In order to fix each fixing support member 230 to the corrugated tube 16, first, the first half 240 and the second half 242 are opened, and the corrugated tube 16 is set in the tube insertion hole 235a of the first half 240 such that the ridge portion 235b fits into one of the annular valley portions 18. Then, the second half 242 is pivoted about the hinge portion 244 toward the first half 240 so as to close the first half 240 and the second half 242 and lock the lock portion 246. A description will be given assuming that the movable support members 130 and the fixing support members 230 are fixed to the corrugated tube at predetermined attachment positions, but the movable support members 130 and the fixing support members 230 may also be temporarily fixed at positions different from the predetermined attachment positions.

For preparation of path control members 20, first, an elongated member is formed through extrusion molding or the like, and at the same time, the elongated member is sequentially cut into pieces of a desired length. Then, each cut piece of a desired length is bent into a shape that conforms to the path in the vehicle 90 using a bending machine or the like. Path control members 20 having different shapes can be produced on separate production lines. At this time, even in the case where it is necessary to perform a design change on the wire harness 10, if the design change needs to be made only to one of the path-controlled sections, it is only necessary to change the design of the path control member 20 in that path-controlled section, and thus path control members 20 whose design is unchanged can be used in other path-controlled sections. Also, even in different types of vehicles, if the path-controlled sections are path-controlled to a similar shape, common path control members 20 can be used. Accordingly, it can be said that the wire harness 10 is suitable for mass production of the path control members 20.

The wire harness main body 11 to which support members 30 have already been attached and the path control members 20 may be produced in a place other than an assembling workshop, and then transported to the assembling workshop. In this case, because the path control members 20 have not been attached to the wire harness main body 11, the wire harness main body 11 can be transported in a coiled state. Also, a path control member 20 is provided for each path-controlled section, and thus each path control member 20 can be made relatively short as compared with the configuration in which the entire wire harness main body 11 is path-controlled using one path control member. Accordingly, the path control members 20 are less bulky. As a result, the transportation cost of the wire harness main body 11 and the path control members 20 can be kept low.

Next, in an assembling workshop, the path control members 20 are attached to the wire harness main body 11 so as to obtain a wire harness 10. The assembling workshop may be located, for example, at a position close to the workshop where the wire harness 10 is fixed to a vehicle body. It is thereby possible to keep down the transportation cost of the wire harness 10 that is costly as compared with that of the wire harness main body 11 and the path control members 20. Also, in the present embodiment, there is a path-controlled section in which a path control member 20 is not provided between path-controlled sections in which path control members 20 are provided. Accordingly, the wire harness 10 can be transported by being bent in an arbitrary direction at the path-controlled section in which a path control member 20 is not provided. By doing so, the wire harness 10 can be made less bulky, and the transportation cost can be kept low.

In order to attach a path control member 20 to the wire harness main body 11, first, the path control member 20 is passed through the hollow portions of the first supporting portions 132 of movable support members 130. At this time, the path control member 20 is passed through the movable support members 130 sequentially from a movable support member 130 that is positioned on one end side of a path-controlled section in the extension direction of the path-controlled section to a movable support member 130 that is positioned on the other end side of the path-controlled section. The path-controlled section of the wire harness main body 11 is thereby flexurally deformed into a shape that conforms to the shape of the path control member 20. Then, an end portion of the path control member 20 is press-fitted into the first supporting portion 232 of a fixing support member 230 so as to fix the path control member 20 to the fixing support member 230. At this time, both ends of the path control member 20 are fixed respectively to two fixing support members 230 that are respectively positioned on both end sides of the path-controlled section in the extension direction.

Alternatively, as another production method, at the time when a path control member 20 is passed through the hollow portions of the first supporting portions 132 of the movable support members 130, the support of the second supporting portions 134 may be released. Then, the second supporting portions 134 and the corrugated tube 16 may be connected after the path control member 20 has been inserted through all movable support members 130 in the path-controlled section. Likewise, with respect to the fixing support member 230, at the time when the path control member 20 is connected to the first supporting portion 232, it is possible to temporarily unlock the lock portion 246 so as to open the first half 240 and the second half 242, then set the path control member 20 in the control member insertion hole 233a, and close the first half 240 and the second half 242 so as to sandwich the path control member 20 and the corrugated tube 16.

With the wire harness 10 configured as described above, the movable support members 130 are movable relative to the path control member 20 in the extension direction, and thus the path control member 20 can be easily connected to the corrugated tube 16 at a desired position. For example, at the time when the path control member 20 is attached to the movable support members 130 that have already been attached to the corrugated tube 16, the path control member 20 can be moved to a desired position relative to the movable support members 130 while being supported by the movable support members 130. Accordingly, with the movable support members 130, the corrugated tube 16-equipped electric line 12 (here, the wire harness main body 11) and the path control member 20 can be easily connected.

Also, the paths of a plurality of sections extending in the extension direction of the electric line 12 are controlled by separate path control members 20. Accordingly; each path control member 20 can be made relatively short, and thus each path control member 20 can be easily connected to the wire harness main body 11. Furthermore, in the case where it is necessary to perform a design change only on one of the sections of the electric line 12, by simply performing a design change on the path control member 20 of that section, it is possible to cope with the design change of the path of the electric line 12, Also, even in different types of vehicles, if there are sections that have a similar path, common path control members 20 can be used in the sections. Also, the path control members 20 are sized so as to conform to the size of each section, and thus the size of the path control members 20 can be reduced. Accordingly, the path control members 20 are less bulky during transportation. It is thereby possible to reduce the cost for path control of the electric line 12 using the path control members 20.

Also, each path control member 20 can be fixed to a desired position on the corrugated tube 16 using the fixing support member 230.

Also, respective end portions of two path control members 20 can be fixed using one fixing support member 230, and thus the number of fixing support members 230 can be reduced.

Also, because the fixing support member 230 also functions as a vehicle body fixing component, and it is therefore unnecessary to separately provide a vehicle body fixing component.

Also, the path control member 20 can be formed through flexural deformation. Because the path control member 20 can be formed using a bending machine, it is possible to avoid equipment investment.

Variations

A variation of the wire harness 10 will be described next.

Figure 7:
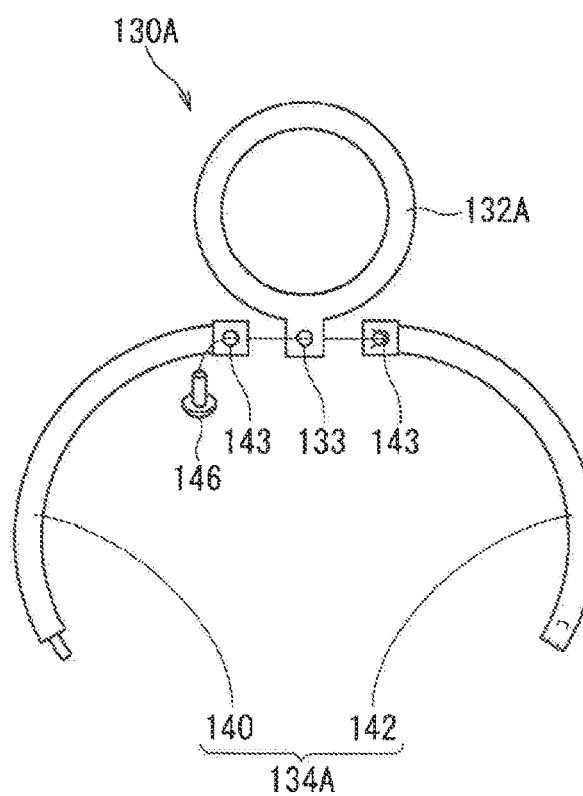
FIG. 7 is a schematic front view showing a variation of the movable support member.

First, a variation of the movable support member 130 will be described with reference to FIG. 7. FIG. 7 is a schematic front view showing a variation of the movable support member 130.

A movable support member 130A according to the variation is different from the movable support member 130 according to the embodiment in that a first supporting portion 132A and a second supporting portion 134A are separate portions.

Through holes 133 and 143 are formed respectively in the first supporting portion 132A and the second supporting portion 134A. As a result of a pin 146 being inserted into the through holes 133 and 143, the first supporting portion 132A and the second supporting portion 134A are fixed to each other. The first supporting portion 132A and the second supporting portion 134A may be, for example, molded articles produced using different dies.

Furthermore, in this example, the second supporting portion 134A is composed of two semi-arc shaped members 140 and 142. The through hole 143 is formed on one end side of each of the two semi-arc shaped members 140 and 142. As a result of the pin 146 being inserted into the through holes 143, the second supporting portion 134A is fixed to the first supporting portion 132A. At this time, the two semi-arc shaped members 140 and 142 are fixed so as to be capable of pivoting about the pin 146. The second supporting portion 134A is brought into a closed state by pivoting the two semi-arc shaped members 140 and 142 so as to bring the other end sides close to each other, and is brought into an open state by pivoting the two semi-arc shaped members 140 and 142 so as to move the other end sides away from each other.

As another variation, for example, the first supporting portion 132 of the movable support member 130 may also be configured so as to be capable of changing between a closed state and an open state, in the same manner as the second supporting portion 134.

Also, in the fixing support member 230, the first half 240 and the second half 242 may not be connected via the hinge portion 234. In this case, the lock portion 246 may be formed on the opposite side across the first supporting portion 232 and the second supporting portion 234. Also, for example, the fixing support member may be composed of a first half, a second half, and a third half. In this case, the first half and the second half may be combined to form a first supporting portion, and the first half and the third half may be combined to form a second supporting portion. With this configuration, it is possible to separately perform a step of combining the first half and the second half while sandwiching the path control member 20, and a step of combining the first half and the third half while sandwiching the corrugated tube 16.

Also, in the foregoing description, a configuration has been described in which the vehicle body fixing portion 236 of the fixing support member 230 is fixed to a vehicle body using the stud bolt 81 and the nut 82, but this configuration is not a requirement. The vehicle body fixing portion may also have a clip-shaped portion, and may be fixed to a vehicle body as a result of the clip-shaped portion being inserted into and supported by an attachment hole formed in the vehicle body.

Also, a configuration may be possible in which a valley portion that is similar to the annular valley portion 18 of the corrugated tube 16 is formed in a portion of the path control member 20 that is supported by the fixing support member 230, and a ridge portion that fits into the valley portion is formed on the inner surface of the control member insertion hole 233a, With this configuration, it is possible to prevent the path control member 20 from moving relative to the fixing support member 230 in the extension direction, without press-fitting the path control member 20.

Also, in the foregoing description, a configuration has been described in which a plurality of sections of the electric line 12 is path-controlled using separate path control members 20, but the present disclosure is not limited to this configuration. Only one section of the electric line may be path-controlled using one path control member. In this case, the position, length and the like of the section in which the electric line 12 is path-controlled by the one path control member may be set as appropriate. The section may be one of the sections of the electric line 12, or may be a section extending along the entire electric line 12.

The constituent elements described in the embodiment and the variations given above may be combined as appropriate as long as this does not lead to contradictions.

The present disclosure has been described in detail above, but the description given above merely illustrates examples in all aspects, and thus the present disclosure is not limited thereto. It is to be understood that a number of variations that are not described herein are also encompassed within the scope of the present disclosure without departing from the scope of the present disclosure.

The invention claimed is:

1. A wire harness comprising:
   an electric line;
   a corrugated tube that includes annular ridges and annular valleys alternately formed along an extension direction, and that covers the electric line;
   a path control that is arranged in at least one section that extends in the extension direction of the electric line so as to be parallel to the corrugated tube, and that is shaped so as to conform to a path along which the electric line is arranged in the at least one section and to control the path in the at least one section; and
   a support that includes a first support that supports the path control and a second support that is fitted into the annular valleys of the corrugated tube so as to support the corrugated tube, the support being configured to connect the path control to the corrugated tube,
   wherein the support includes a movable support that is movable relative to the path control in the extension direction of the path control, with the first support supporting the path control.

2. The wire harness according to claim 1,
wherein the support further includes a fixing support whose first support is formed fixable to the path control while restricting movement of the path control in the extension direction, and that fixes the path control to the corrugated tube while restricting the movement of the path control in the extension direction.

3. The wire harness according to claim 2,
wherein the path control includes plural path controls, and the first support of the fixing support is formed so as to be capable of fixing respective ends of the plural path controls.

4. The wire harness according to claim 2,
wherein the fixing support further includes a vehicle body fixing for attaching the electric line to a vehicle body.

5. The wire harness according to claim 1,
wherein the path control is formed using a flexurally deformable that can undergo plastic deformation.

6. The wire harness according to claim 1,
wherein a plurality of sections in the extension direction of the electric line are path-controlled by separate path controls.

* * * * *